April 6, 1965  R. E. NELSON  3,177,400
PROPELLER SYNCHRONIZER MODULE WITH SYNCHROPHASING CIRCUIT
Filed March 29, 1960  3 Sheets-Sheet 1

INVENTOR.
Robert E. Nelson
BY
W. E. Finken
HIS ATTORNEY

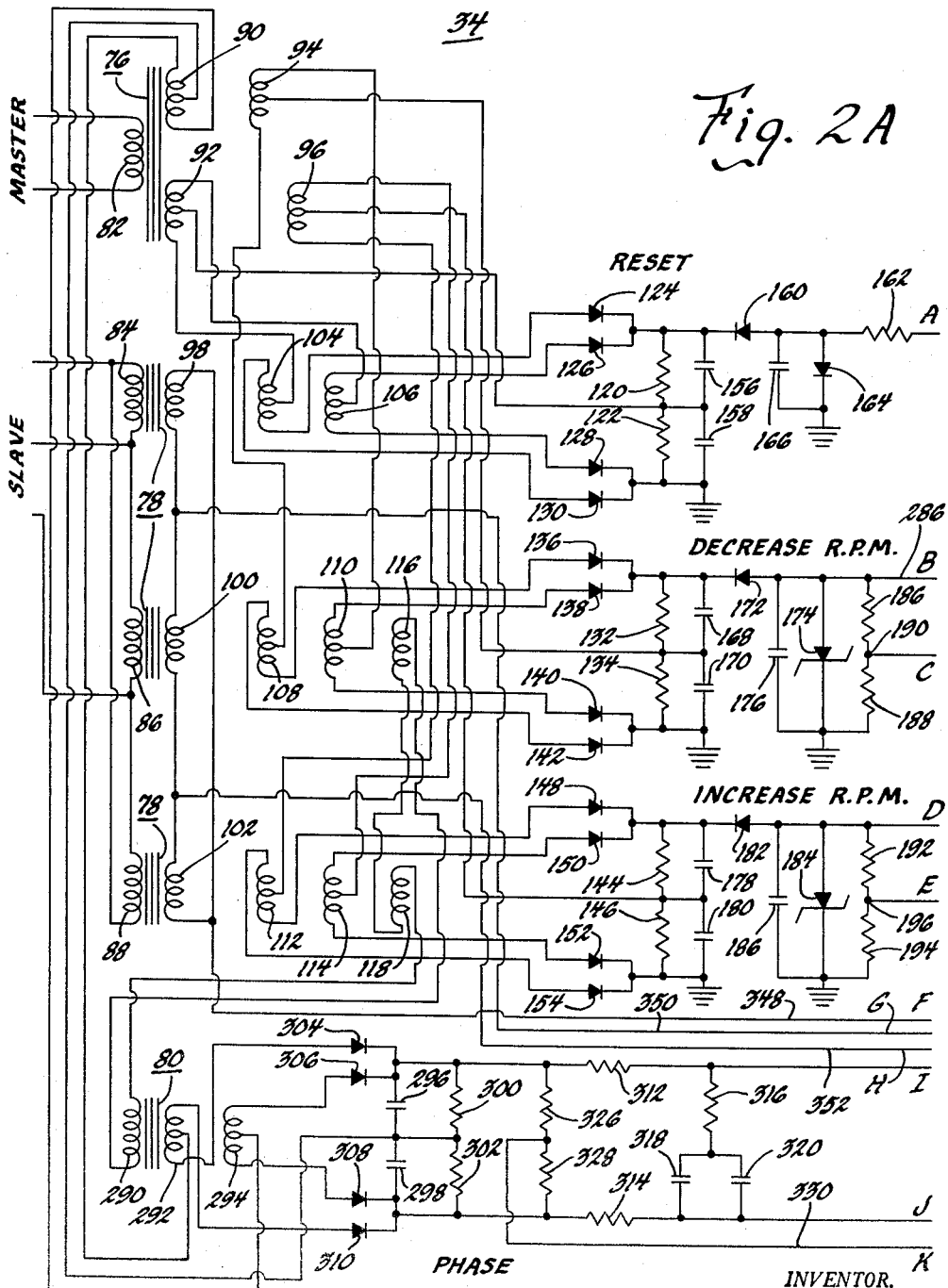

April 6, 1965 R. E. NELSON 3,177,400
PROPELLER SYNCHRONIZER MODULE WITH SYNCHROPHASING CIRCUIT
Filed March 29, 1960 3 Sheets-Sheet 3

INVENTOR.
Robert E. Nelson
BY
W. E. Finken
HIS ATTORNEY

United States Patent Office 3,177,400
Patented Apr. 6, 1965

3,177,400
PROPELLER SYNCHRONIZER MODULE WITH SYNCHROPHASING CIRCUIT
Robert E. Nelson, Indianapolis, Ind., assignor to General Motors Corporation, Detroit, Mich., a corporation of Delaware
Filed Mar. 29, 1960, Ser. No. 18,379
9 Claims. (Cl. 317—6)

This invention pertains to means for deriving speed error signals and phase error signals together with means for developing speed correction signals for use in a synchronizing and synchrophasing system for a plurality of variable pitch propellers.

At the present time some turbo-prop aircraft are equipped with synchronizing and synchrophasing control means of the type disclosed in copending application Serial No. 630,234, filed December 24, 1956, in the name of Paul E. Brockert et al., and assigned to the assignee of this invention, now Patent 3,007,529. One of the components of the aforesaid synchronizing and synchrophasing control means is a differential motor, commutator, and motor-potentiometer module which is used to derive speed error signals and phase error signals, and to develop speed correction signals for energizing an electric motor driven rotary actuator for adjusting the speed setting of the governor of a slave propeller. The present invention relates to an electronic module adapted to replace the differential motor, commutator, and motor-potentiometer module of the synchronizing and synchrophasing control system disclosed in the aforementionad copending application.

Accordingly, among my objects are the provision of a phase discriminator circuit for deriving speed and/or phase error signals; the further provision of a pulse transformer circuit for interpreting the speed error signals derived from the phase discriminator circuit; the further provision of a transistor amplifier for developing speed correction signals; and the still further provision of a phase discriminator circuit, a resistor-condenser network, and a transistor amplifier for deriving phase error signals.

The aforementioned and other objects are accomplished in the present invention by comparing the frequency and phase angles of the alternating current signals produced by alternators driven by the master and slave propellers. Specifically, the disclosed module includes a synchronizer reset circuit, a synchronizer decrease r.p.m. circuit, a synchronizer increase r.p.m. circuit and a synchrophasing circuit. The three synchronizing circuits include phase discriminators and clipping circuits, the outputs of which are supplied to a pulse transformer having a pair of output windings which are connected to a pair of transistor amplifier circuits for producing an output signal for energizing the electric motor driven rotary actuator.

When there is a speed error between the master and slave propellers, the three phase discriminator circuits produce alternating current signals having a phase relationship dependent upon whether the speed of the slave propeller is greater than or less than the speed of the master propeller. The pulse transformer includes three primary windings and two secondary windings. The primary windings comprise a winding energized by the reset circuit, a positive feedback from the amplifiers, and the increase r.p.m. and decrease r.p.m. circuits. A signal will only be induced in the secondary windings if it immediately follows the reset pulse. Accordingly, the pulse transformer accepts only the speed error signal which will result in producing the proper speed correction signal. The speed correction signals are amplified by the transistor amplifier through which one or the other field windings of the split series electric meter for the rotary actuator is energized.

The phase discriminator section of the phase circuit develops a signal dependent upon the phase relationship between the signals of the master and slave propeller driven alternators. The discriminator output is zero when the master and slave alternators are in phase, and a maximum when the master and slave alternators are 90° out of phase. The output voltage of the discriminator is supplied to the resistor-condenser network which produces an output signal that is supplied to a push-pull transistor amplifier. The signal produced by the push-pull transistor amplifier is supplied to an electronic control system, or module, of the type disclosed in the aforementioned copending application. The output of the electronic synchrophasing module controls the energization of a solenoid valve which hydraulically biases the constant speed governor valve of the slave propeller to maintain a predetermined phase relationship between the blades of the slave propeller and the blades of the master propeller.

Further objects and advantages of the present invention will be apparent from the following description, reference being had to the accompanying drawings, wherein a preferred embodiment of the present invention is clearly shown.

In the drawings:

FIGURES 2A and 2B are schematic drawings of the electronic module of the present invention.

Figure 1:
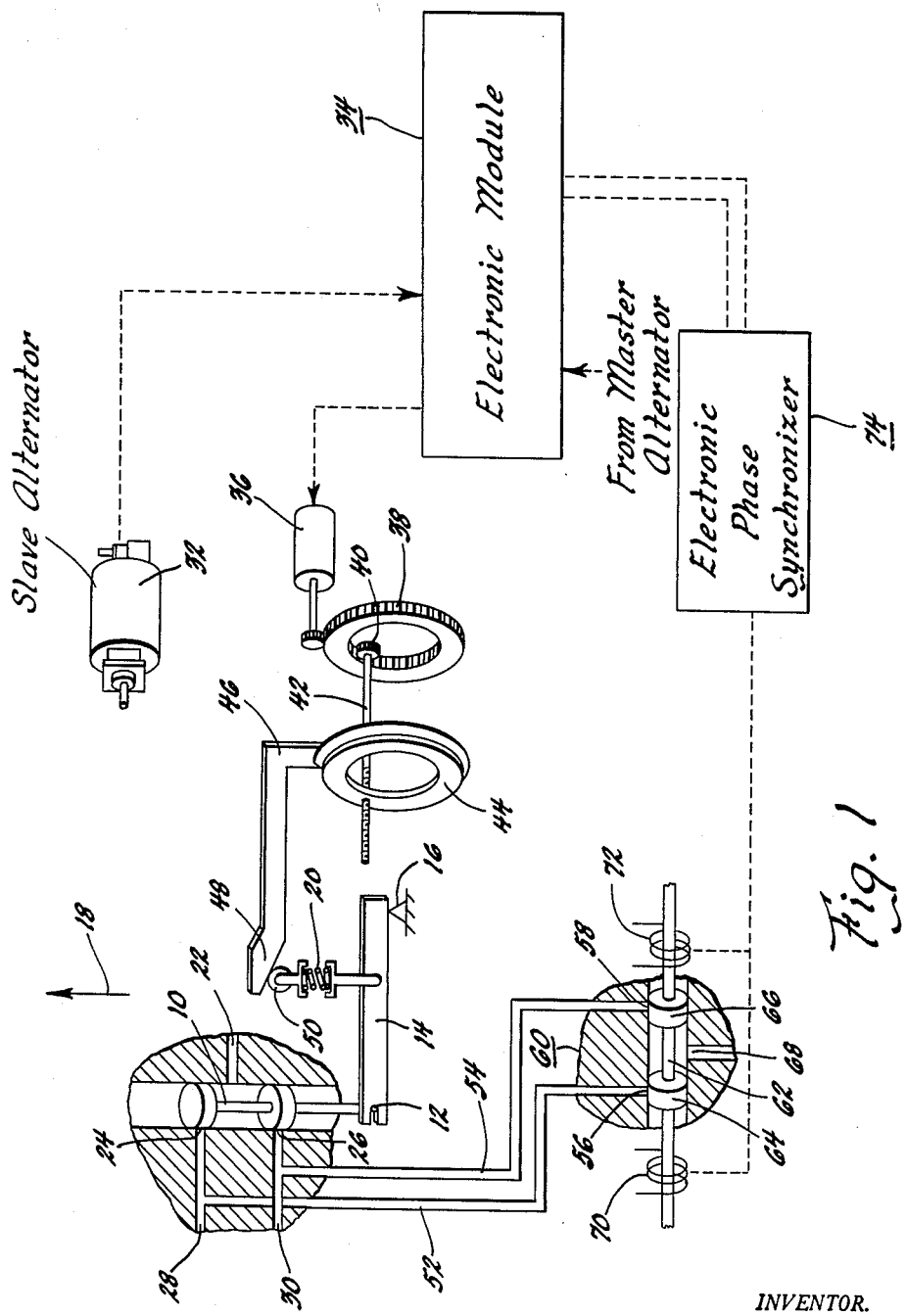
FIGURE 1 is a composite electrical and hydraulic schematic of the speed synchronizer and phase synchronizer.

With reference to FIGURE 1, the synchronizing and synchrophasing control system will be described in composite form. Each propeller includes a centrifugally responsive governor valve 10, one end of which is articulated at 12 to the end of a lever 14. The lever 14 is movable about a fulcrum 16 in response to centrifugal force acting on the lever 14 and the valve 10 in the direction of arrow 18. Upward movement of the valve 10 and lever 14 is opposed by a compression spring 20. The valve 10 includes a pressure supply port 22 and a pair of control ports 24 and 26. The control ports 24 and 26 are connected respectively to passages 28 and 30 which, in turn, connect with opposed chambers of propeller pitch adjusting torque units, not shown. Upon upward movement of the valve 10, fluid under pressure will be supplied to passage 28 while the passage 30 is connected to drain so as to increase propeller pitch. Conversely, upon downward movement of the valve 10, the passage 28 will be connected to drain and the passage 30 will be connected to the supply of fluid under pressure so as to decrease propeller pitch.

During propeller rotation at the speed setting of the governor, which comprises the valve 10, the lever 14, and the spring 20, centrifugal force acting in the direction of arrow 18 on the valve 10 and the lever 14 is exactly balanced, or in equilibrium, with the force of the spring 20. Each propeller drives a two pole, three phase alternator, which is indicated by numeral 32, at a speed of four times propeller speed. Since the nominal propeller speed is 1020 r.p.m., the nominal frequency of the alternating current signals produced by the alternator 32 is 68 c.p.s. In a four propeller installation, either of two propellers may be selected as the master, with the remaining propellers being slaved thereto. The outputs of the master and slave alternators are supplied to the electronic module schematically depicted by numeral 34, to be described. The electronic module 34 produces an output signal for energizing a reversible direct current actuator motor 36 of the split series type. The actuator motor 36 drives a ring gear 38 which drives a pinion gear 40. The pinion gear 40, in turn, rotates a high lead screw 42 which threadedly engages a control ring 44 disposed within the rotating regulator of the propeller. Accordingly, upon rotation of the output shaft of the actuator motor 36 in either direction, linear movement will be imparted to the control ring 44.

The control ring 44 is engaged by a control shoe 45 which rotates with the propeller regulator and has a mechanical slip ring connected with the control ring 44. The control shoe 46 is shown integral with a cam 48 that coacts with a roller 50 for adjusting the load on the governor spring 20. As will be pointed out in particular hereinafter, the actuator motor 36 rotates at a rate and in a direction dependent upon the difference in speed between the motor and slave propellers so as to reset the governor spring 20 and obtain speed synchronization between the master and slave propellers. When speed synchronization between the master and slave propellers is achieved, the actuator motor 36 will be deenergized, and thus stationary.

The control passages 28 and 30 are connected by conduits 52 and 54, respectively, to the control ports 56 and 58, respectively, of a solenoid valve 60. The solenoid valve 60 includes a plunger 62 having spaced lands 64 and 66 which cooperate with ports 56 and 58, respectively. The solenoid valve includes a pressure inlet port 68, and the plunger 62 is normally centered so that lands 64 and 66 close ports 56 and 62, respectively, by a pair of opposed springs, not shown. The valve plunger 62 can be moved in either direction by energizing solenoid winding 70 or 72. The output of an electronic phase synchronizer, depicted schematically by numeral 74, of the type disclosed in the aforementioned copending application Serial No. 630,234, is such that the solenoid valve plunger 62 is continuously pulsed on either side of the center position during operation of the electronic phase synchronizer circuit. The time duration of the pulses is controlled in accordance with the synchrophasing signals derived from the electronic module 34. Accordingly, the net flow from the solenoid valve 60 is determined by the pulse ratio, and this flow is used to bias the hydraulic governor valve 10 so as to maintain the desired phase relationship between the propeller blades of the master and slave propellers.

Figure 2B:
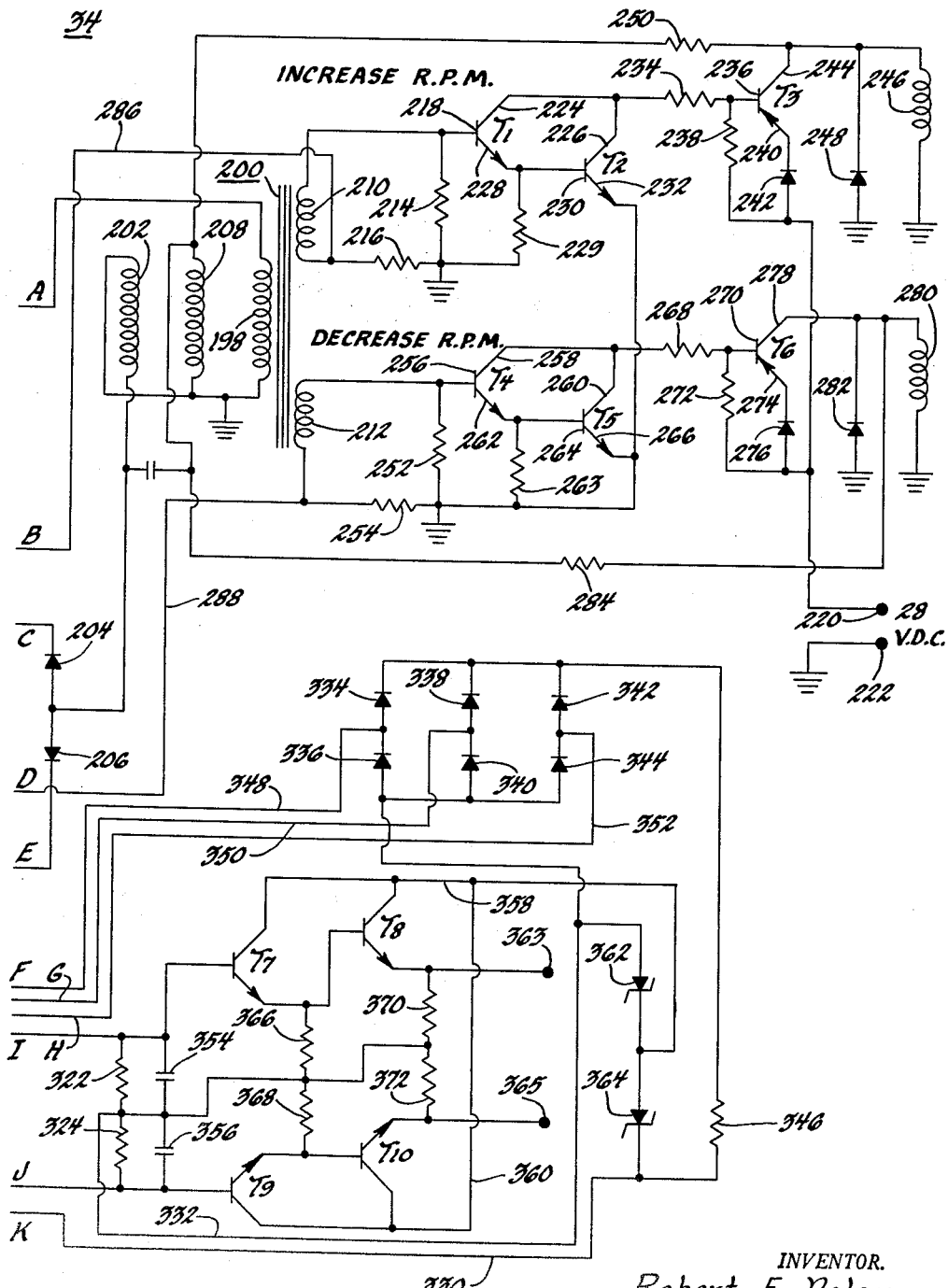

With particular reference to FIGURES 2A and 2B, the electronic module of the present invention will be described. The electronic module 34 includes three input transformers 76, 78, and 80. The input transformer 76 includes a primary winding 82 which is energized from one phase of the master propeller driven alternator. Transformer 78 includes three primary windings 84, 86 and 88 which are energized from the three phases of the slave propeller driven alternators.

Transformer 76 has four secondary windings 90, 92, 94 and 96, all of which are center tapped. Transformer 78 has three serially connected secondary windings 98, 100 and 102; six center tapped secondary windings 104, 106, 108, 110, 112 and 114; and two serially connected secondary windings 116 and 118.

Secondary winding 92 of transformer 76 has its opposite ends connected with the center taps on secondary windings 104 and 106 of transformer 78 which are in inductive relation with primary winding 84. The center tap of secondary winding 92 is connected to the junction between resistors 120 and 122 of the reset circuit. Resistor 120 is connected with pn junction rectifiers, or diodes, 124 and 126, and resistor 122 is connected with diodes 128 and 130. Diode 124 is connected to one end of secondary winding 104, diode 126 is connected to one end of secondary winding 106; diode 128 is connected to the other end of secondary winding 106 and diode 130 is connected to the other end of secondary winding 104. The secondary windings 92, 104 and 106; the resistors 120 and 122; and the diodes 124, 126, 128 and 130 constitute a phase discriminator.

The alternating current signal induced in the secondary winding 92 from the master alternator is out of phase with the alternating current signals in the secondary windings 104 and 106 derived from the slave alternator in all instances except when there is exact speed and phase synchronization between the master and slave propellers. Assuming a speed error between the master and slave propellers, the direct current potential across resistors 120 and 122 is directly proportional to the phase angle difference between the signals of the master and slave propeller driven alternators. Actually, the voltage across the resistors 120 and 122 is equal to the difference between the voltages across each resistor 120 and 122 due to the cutoff characteristics of the diodes 124, 126, 128 and 130.

The ends of the secondary winding 94 of the transformer 76 are connected to the center taps of secondary windings 108 and 110 of the transformer 78 which are in inductive relationship with the primary winding 86 of the transformer 78. The center tap of the secondary winding 94 is connected to the junction of resistors 132 and 134. Resistor 132 is connected with diodes 136 and 138; and resistor 134 is connected with diodes 140 and 142. Diode 136 is connected to one end of secondary winding 108 and diode 138 is connected to one end of secondary winding 110. Diode 140 is connected to the other end of secondary winding 110 and diode 142 is connected to the other end of secondary winding 108. The secondary windings 94, 108, and 110; the resistors 132 and 134; and the diodes 136, 138, 140 and 142 constitute a phase discriminator circuit in the decrease r.p.m. circuit, which circuit operates in the same manner as the phase discriminator of the reset circuit, aforedescribed.

Opposite ends of secondary winding 96 of the transformer 76 are connected to the center taps of secondary windings 112 and 114 of the transformer 78 which have an inductive relationship with the primary winding 88. The center tap of secondary winding 96 is connected to the junction between resistors 144 and 146. Resistor 144 is connected to diodes 148 and 150, and resistor 146 is connected to diodes 152 and 154. Diode 148 is connected to one end of secondary winding 112, and diode 150 is connected to one end of secondary winding 114. Diode 152 is connected to the other end of secondary winding 114, and diode 154 is connected to the other end of secondary winding 112. The secondary windings 96, 112 and 114; the resistors 144 and 146; and the diodes 148, 150, 152 and 154 constitute a phase discriminator for the increase r.p.m. circuit, which operates in the same manner as the phase discriminator circuit of the reset circuit, aforedescribed.

Thus, the phase discriminator of the decrease r.p.m. circuit produces an output proportional to the phase difference between the signal of the master alternator and the second phase of the slave alternator; while the phase discriminator of the increase r.p.m. circuit produces an output proportional to the phase difference between the master alternator and the third phase of the slave alternator. When the master and slaves are rotating at different angular velocities, the voltages developed by the three phase discriminators have a predetermined phase relationship, dependent upon whether the speed of the slave propeller is greater than, or less than, the speed of the master propeller.

The resistors 120 and 122 are shunted by condensers 156 and 158 which function to suppress peak transient voltages across the resistors 120 and 122. A diode 160 in the reset circuit operates to block current flow through resistor 162 when the output of the phase discriminator of the reset circuit is positive with respect to ground. A Zener diode 164, shunted by condenser 166, is connected to ground between the diode 160 and the resistor 162. The Zener diode functions as a clipping circuit for the negative portion of the alternating current signal produced by the phase discriminator.

The decrease r.p.m circuit likewise includes condensers 168 and 170 which shunt resistors 132 and 134, respectively; a diode 172, a Zener diode 174 and a condenser 176. Similarly, the increase r.p.m. circuit includes condensers 178 and 180 which shunt resistors 144 and 146, respectively; a diode 182, a Zener diode 184 and a condenser 186. The diodes 172 and 182 likewise block current flow from the phase discriminator of the decrease r.p.m circuit and the increase r.p.m. circuit when the outputs are positive with respect to ground. Similarly, the Zener diodes 174 and 184 function to clip the negative portion of the alternating current signal from the phase discriminator of the decrease r.p.m. circuit and the increase r.p.m. circuit. In addition, the Zener diode 174 is shunted by a pair of resistors 186 and 188 having a junction at 190; and the Zener diode 184 is shunted by resistors 192 and 194 having a junction at 196. During speed differences between the master and slave propellers, substantially square wave pulses are generated by the rest circuit, the decrease r.p.m. circuit and the increase r.p.m. circuit. The phase relationship between the signals of the reset circuit, the decrease r.p.m. circuit and the incerase r.p.m. circuit is dependent upon whether the slave propeller is rotating faster or slower than the master propeller. In instances where the master and slave propellers rotate at the same r.p.m., a constant voltage output will be derived from the reset circuit, the decrease r.p.m. circuit and the increase r.p.m. circuit, dependent upon the phase relationship between the alternating current signals developed by the master and slave propeller driven alternators.

The output of the reset circuit is impressed on a primary winding 198 of a pulse transformer 200. The primary winging 198 will hereinafter be referred to as the reset winding of transformer 200. The transformer 200 includes an input winding 202 which is connected to the junction of diodes 204 and 206. Diode 204 is connected to junction 190 between resistors 186 and 188 on the decrease r.p.m. circuit. Diode 206 is connected to the junction between resistors 192 and 194 on the increase r.p.m. circuit. The transformer 200 includes a third primary winding 208, hereinafter referred to as the positive feedback winding.

The transformer 200 includes two secondary, or output windings 210 and 212. The transformer 200 is termed a pulse transformer since a signal will only be induced in the output windings 210 and 212 if it immediately follows a signal impressed on the reset winding 198. Assuming a reset pulse has occurred in the winding 198, if the speed of the slave propeller is less than that of the master, a pulse from the increase r.p.m. circuit next occurs so that a signal is induced in output windings 210 and 212. A pulse from the decrease r.p.m. circuit follows, but since the transformer 200 will not be operative until a second reset pulse occurs, the decrease r.p.m. pulse will not be induced in the output windings 210 and 212. Conversely, if slave propeller r.p.m. is greater than the master propeller, a pulse from the increase r.p.m. circuit will occur first after the reset pulse, and the subsequent pulse from the increase r.p.m. circuit will be ineffective.

The signal in the output windings 210 and 212 comprises a positive square wave signal. The winding 210 is connected with a three stage transistor amplifier comprising transistor T1, transistor T2 and transistor T3. Resistors 214 and 216 are connected between the ends of the output winding 210, the junction of resistors 214 and 216 being connected to ground. The signal developed across resistor 214 is impressed on the base electrode 218 of the transistor T1 which is operated in the common emitter connection. The transistors T1 and T2 are of the NPN type whereas the transistor T3 is of the PNP type. The power supply for the transistor amplifiers comprises a 28 volt direct current source connected between terminals 220 and 222. The collector electrode 224 of the transistor T1 is connected to collector electrode 226 of the transistor T2. The emitter electrode 228 of the transistor T1 is connected to the base electrode 230 of transistor T2. The output signal from transistor T1 is developed across a resistor 229 connected in the emitter circuit, and is impressed on the base 230 of transistor T2. The emitter electrode 232 of transistor T2 is connected to ground. The collector 226 of the transistor T2 is coupled through a resistor 234 to the base electrode 236 of the transistor T3. The base electrode 236 of the transistor T3 is coupled through a resistor 238 to the 28 volt power source. The emitter electrode 240 of the transistor T3 is connected through a diode 242 to the 28 volt power source. The collector electrode 244 of the transistor T3 is connected to one winding 246 of the split series field of the actuator motor 36 which is shunted by a diode 248. The diode 248 acts to suppress negative spikes generated with the removal of the pulse from winding 246. The collector 244 is also connected through a resistor 250 to one end of the positive feedback winding 208 of the transformer 200.

The output signal of the secondary winding 212 is impressed on a three stage transistor amplifier including transistors T4, T5 and T6 through a resistor network including resistors 252 and 254. The signal is impressed on the base electrode 256 of the transistor T4, the collector electrode 258 being connected to the collector electrode 260 at transistor T5. The emitter electrode 262 of the transistor T4 is connected to the base electrode 264 of the transistor T5, the output signal of the transistor T4 being developed across resistor 263. The emitter electrode 266 of the transistor T5 is connected to ground. The collector electrode 260 to transistor T5 is coupled through resistor 268 to the base electrode 270 of the transistor T6. The base electrode 270 is also coupled through resistor 272 to the 28 volt power supply. The emitter electrode 274 of the transistor T6 is connected through a diode 276 to the 28 volt power supply. The collector electrode 278 of the transistor T6 is connected to the other winding 280 of the split series field actuator motor 36 which is likewise shunted by a diode 282. In addition, the collector electrode 278 is coupled through a resistor 284 to the positive feedback winding 208.

The negative decrease r.p.m. control pulse is also fed to the base electrode 218 of transistor T1 through wire 286, and this signal biases the transistor T1 to cutoff during decrease r.p.m. control pulses. Similarly, the base 256 of the transistor T4 in the decrease r.p.m. circuit is coupled through wire 288 to the increase r.p.m. circuit so that the negative increase r.p.m. control pulse will bias the transistor T4 to cutoff during the increase r.p.m. control pulse.

Secondary windings 116 and 118 of transformer 78 are serially connected with primary winding 290 of transformer 80. Since the winding 290 is energized from two windings of the transformer 78, the signal in the primary winding comprises two phases of the slave propeller driven alternator. The transformer 80 includes two secondary windings 292 and 294, both of which are center tapped. Secondary winding 90 of the transformer 76 has its opposite ends connected with the center taps of secondary windings 292 and 294 of transformer 80. The center tap of secondary winding 90 is connected to the junction between condensers 296 and 298 and the junction between resistors 300 and 302. The condensers 296 and 298 shunt the resistors 300 and 302, respectively, and the resistor 300 is connected with diodes 304 and 306. The resistor 302 is connected with diodes 308 and 310. The diode 304 is connected to one end of the secondary winding 292; the diode 306 is connected to one end of the secondary winding 294; the diode 308 is connected to the other end of the secondary winding 294; and the diode 310 is connected to the other end of the secondary winding 292. The secondary windings 292, 294 and 90; the resistors 300 and 302; and the diodes 304, 306, 308 and 310 constitute a phase discriminator. The signal from the slave propeller driven alternator is displaced 90° from the signal from the master propeller driven alternator when the master and slave propellers are in phase. At this time, the discriminator output voltage is zero. Conversely, the output voltage of the discriminator is a maximum when the master and slave alternators are 90° out of phase. Since the instant phase synchronizing system is designed for use with a four blades propeller, and since the alternators are driven at four times propeller speed, it will be appreciated that the maximum phase difference between the propellers can only be 45°, but since the alternators are of the two pole type, the maximum phase difference between the signal of the alternators can be 90°.

The output of the phase discriminator of the phase circuit is supplied to a resistor condenser network which integrates the signal from the phase discriminator. The RC network comprises current limiting resistors 312 and 314, the RC circuit comprising resistor 316 and the condensers 318 and 320, and output resistors 322 and 324. The input to the RC network is developed across resistors 300 and 302. The junction of resistors 326 and 328 is connected to wire 330. The junction of resistors 322 and 324 is connected to wire 332. Wire 332 connects with one side of a three phase full wave rectifier comprising diodes 334, 336, 338, 340, 342 and 344, and wire 330 connects with the other side of the three phase full wave rectifier through resistor 346. The junction between diodes 334 and 336 is connected by wire 348 to one side of secondary winding 102 of the transformer 78. The junction between diodes 338 and 340 is connected by wire 350 to one side of secondary winding 98 of transformer 78; and the junction between diodes 342 and 344 is connected by wire 352 to one side of the secondary winding 100 of the transformer 84.

The resistors 322 and 324 are shunted by condensers 354 and 356, respectively. The output is supplied to a push-pull transistor amplifier, each side including a pair of transistors T7 and T8, and T9 and T10, respectively. The transistors T7 through T10 are of the NPN type, and the collector electrodes thereof are connected by wires 358 and 360 to the junction between Zener diodes 362 and 364. This arrangement provides a nominal collector voltage of approximately 28 volts D.C. The base electrodes of transistors T7 and T9 are directly coupled to the resistors 322 and 324 of the RC network. The emitter electrodes of transistors T7 and T9 are directly coupled to the base electrodes of transistors T8 and T10, respectively, and the emitter electrodes of transistors T8 and T10 are connected to output terminals 363 and 365, respectively. Wire 332 connects with the junction between resistors 366 and 368, the other ends of which are connected to emitters of the transistors T7 and T9, respectively, and also connects with the junction of resistors 370 and 372, the other ends of which are connected to the emitters of transistors T8 and T10, respectively. The output signal of the phase circuit between terminals 363 and 365 is proportional to the speed integral constant between the master and slave propellers and the phase error rate. This signal is used as the input to the electronic phase synchronizer depicted schematically by numeral 74 in FIGURE 1, which is of the type disclosed in the aforementioned copending application Serial No. 630,234.

The resistors 326, 312, 322, 324, 314 and 328 comprise a bridge circuit for supplying base current bias to transistors T7 and T9. Wires 330 and 332 supply bias voltage to the bridge circuit from Zener diodes 362 and 364. The voltage from the phase discriminators are summed with the voltage from the Zener diodes 362 and 364 thereby enabling the use of a high impedance transistor circuit having a high power gain which is drift free during temperature variations.

While the embodiment of the invention as herein disclosed constitutes a preferred form, it is to be understood that other forms might be adopted.

What is claimed is as follows:

1. Means for comparing the frequency of a pair of alternating current signals and producing an output proportional to the difference in frequency and the sense of the frequency difference including, first, second and third phase discriminator circuits for comparing said input signals and producing output alternating current signals directly proportional to the difference in frequency between said input signals, means blocking the positive cycle of the output signals of said phase discriminators, a pulse transformer having a plurality of primary windings and a pair of secondary windings, means connecting the output of said first phase discriminator to one of said primary windings, means connecting the outputs of the second and third phase discriminators to another primary winding; means deriving an output signal from said pulse transformer only in response to consecutive output signals from the first phase discriminator and either the second or the third phase discriminator, and a pair of amplifiers connected to the secondary windings of said pulse transformer and having an output correlated to the sense of the frequency difference between said alternating current signals.

2. In a speed synchronizer system for master and slave rotating members, a three phase alternator driven by said master rotating member for producing a three phase alternating current signal having a frequency proportional to the speed of said master rotating member, a three phase alternator driven by the slave rotating member for producing three phase alternating current signal having a frequency proportional to the speed of the slave rotating member, first, second and third phase discriminator circuits for comparing each phase of said slave alternator signal with one phase of said master alternator signal and producing alternating current output signals directly proportional to the difference in ferquency between said alternator signals, means blocking the positive cycle of the output signals of said phase discriminators, a pulse transformer having a plurality of primary windings and a pair of secondary windings, means connecting the output of said first phase discriminator to one of said primary windings, means connecting the outputs of the second and third phase discriminators with another primary winding, and means deriving a speed correction output signal from said pulse tarnsformer correlated to the sense of the frequency difference between the alternator signals only in response to consecutive output signals from the first phase discriminator and either the second or third phase discriminator.

3. The combination set forth in claim 2 wherein said first, second and third phase discriminators are connected in a reset circuit, an increase r.p.m. circuit and a decrease r.p.m. circuit, and wherein the outputs of the phase discriminators of the increase and decrease r.p.m. circuits are connected to said other primary winding of the pulse transformer.

4. The combination set forth in claim 3 wherein the sense of the frequency difference between said alternator signals determines the sequence of signals from said reset circuit, said increase r.p.m. circuit and said decrease r.p.m. circuit, and wherein said pulse transformer only accepts the signal from said increase and decrease r.p.m. circuits which immediately follows the output signal from the reset circuit.

5. The combination set forth in claim 2 including increase r.p.m. and decrease r.p.m. amplifiers connected to the secondary windings of said pulse transformer, the outputs of said amplifiers being connected to a third primary winding of said pulse transformer constituting a positive feedback circuit.

6. The combination set forth in claim 5 including means connecting the increase r.p.m. amplifier with a decrease r.p.m. circuit, and means connecting the decrease r.p.m. amplifier with an increase r.p.m. circuit whereby the outputs of said increase and decrease r.p.m. circuits will bias the decrease and increase amplifiers to cutoff.

7. A phase discriminator circuit for comparing the phase of a single phase alternating current signal and a two phase alternating current signal including a pair of transformers having primary windings energized by said alternating current signals, the transformer energized by said single phase alternating current signal having a first center tapped secondary winding, the transformer energized by said two phase alternating current signal having a pair of center tapped secondary windings, means connecting the ends of said first secondary winding to the center taps of said pair of secondary windings, a pair of resistors, means connecting the center tap on said first secondary winding with the junction between said resistors, two pairs of diodes, means connecting each end of each of said pair of secondary windings with one diode, and means connecting each pair of diodes with one of said resistors whereby the voltage across said resistors will be a maximum when said single and two phase alternating current signals are 90° out of phase and zero when said single and two phase alternating current signals are in phase.

8. In a phase synchronizing system for master and slave rotating members, three phase alternators driven by said master and slave rotating members, a phase discriminator for comparing the phase of one phase of said master alternator and two phases of said slave alternator and having an output proportional to the phase difference between said alternator signals, an RC circuit for integrating the output signal of said phase discriminator, and means for amplifying said integrated signal.

9. The combination set forth in claim 8 wherein said amplifier means comprises a push-pull amplifier circuit.

References Cited by the Examiner

UNITED STATES PATENTS

| | | | |
|---|---|---|---|
| 2,419,637 | 4/47 | Gabriel et al. | 318—42 |
| 2,722,605 | 11/55 | Mills et al. | 324—83 |
| 2,946,004 | 7/60 | Frank | 324—83 |
| 2,948,843 | 8/60 | Klein | 323—100 |
| 2,953,722 | 9/60 | Willis | 324—83 X |
| 2,963,648 | 12/60 | Baskin et al. | 324—83 |
| 2,986,223 | 5/61 | McDonald | 317—6 X |
| 3,021,481 | 2/62 | Kalmus et al. | 324—83 |
| 3,027,513 | 3/62 | Mulavey et al. | 324—83 |

SAMUEL BERNSTEIN, *Primary Examiner.*

M. O. HIRSHFIELD, *Examiner.*